United States Patent [19]
Katayama et al.

[11] Patent Number: 5,569,486
[45] Date of Patent: Oct. 29, 1996

[54] ELECTROLUMINESCENCE ELEMENT AND PROCESS FOR FABRICATING SAME

[75] Inventors: Masayuki Katayama, Handa; Atsushi Mizutani, Aichi; Yutaka Hattori, Okazaki; Nobuei Ito, Chiryu, all of Japan

[73] Assignees: Nippondenso Co., Ltd, Kariya; Research Development Corporation of Japan, Tokyo, both of Japan

[21] Appl. No.: 172,219

[22] Filed: Dec. 23, 1993

[30]     Foreign Application Priority Data

Dec. 25, 1992   [JP]   Japan .................................... 4-359405
Mar. 15, 1993   [JP]   Japan .................................... 5-081397

[51] Int. Cl.$^6$ ............................................... B05D 5/06
[52] U.S. Cl. ............................ 427/66; 427/69; 427/255.2
[58] Field of Search ............................ 427/66, 69, 255.2

[56]              References Cited

U.S. PATENT DOCUMENTS 4,804,558  2/1989  Saitoh et al. ............................ 427/66
5,006,365  4/1991  Nire ........................................ 427/66
5,372,839  12/1994  Mikami et al. ........................ 427/66

FOREIGN PATENT DOCUMENTS 62-76283    4/1987   Japan .
63-230869   9/1988   Japan .
3-69157    10/1991   Japan .
5-18238     3/1993   Japan .

*Primary Examiner*—Janyce Bell
*Attorney, Agent, or Firm*—Cushman, Darby & Cushman

[57]                ABSTRACT

An electroluminescence element comprises the luminescent layer having a luminescence spectrum in which, in addition to the original emission peaks of the rare earth element, one or more emission peaks exist within a 10 nm wavelength range around each of some original emission peak. The luminescent layer is of a compound semiconductor doped with a rare earth element, deposited by organic metal chemical vapor deposition in which source gases for the rare earth element and elements constituting the compound semiconductor, not containing any halogen element, are supplied to the vicinity of the insulating substrate, separately from halogen or hydrogen halide gas which is also supplied to the vicinity of the insulating substrate.

11 Claims, 8 Drawing Sheets

1 μm
CONC. OF Cl : 0 at%

1 μm
CONC. OF Cl : 0.2 at%

1 μm
CONC. OF Cl : 0.5 at%

1 μm 5,569,486

ELECTROLUMINESCENCE ELEMENT AND PROCESS FOR FABRICATING SAME

BACKGROUND OF THE INVENTION

1. Field of the Invention

The present invention relates to an electroluminescence element and a process for fabricating the same. The electroluminescence element (hereinafter also referred to as "EL element") can be used, for example, as a two dimensional light source for backlighting a meter in a vehicle, or the like.

2. Description of the Related Art

EL elements utilize luminescence of a fluorescent material such as zinc sulfide (ZnS) when an electric field is applied, and have attracted attention as an element for composing a flat panel display.

FIG. 1 shows a typical cross-sectional structure of an EL element, in which the EL element 9 comprises a glass substrate 1 of an insulating material, on which a first electrode 2 of optically transparent ITO, a first insulating layer 3 of, e.g., tantalum pentoxide ($Ta_2O_5$), a luminescent layer 4, a second insulating layer 5 and a second electrode 6 are stacked in this order.

The ITO (indium tin oxide) layer is an electrically conductive transparent layer of indium oxide ($In_2O_3$) doped with tin (Sn) and is widely used as a transparent electrode due to its low electric resistance.

The luminescent layer 4 is, for example, of zinc sulfide as a matrix in which manganese (Mn) or terbium (Tb) is added as a luminescent center.

The luminescent color of an EL element is determined by the kind of the additive in the zinc sulfide. For example, if manganese is added as the luminescent center, the luminescent color of the EL element is yellowish orange and if terbium is added, the luminescent color is green.

EL elements having the above structure, in which samarium (Sm) is added as the luminescent center to zinc sulfide (ZnS) to obtain red luminescence or in which thulium (Tm) is added to zinc sulfide to obtain blue luminescence, have been investigated.

Usually, the electroluminescence from a rare earth element is due to electron transition between the levels of $4f^n$ configuration. For example, the red luminescence obtained in zinc sulfide doped with samarium is due to electron transitions for $^4G_{5/2}$ level to $6H_{7/2}$ level (610 nm luminescence) and from $^4G_{5/2}$ level to $6H_{9/2}$ level (655 nm luminescence).

The electron transitions between these levels are forbidden as electric dipole transitions by the parity rule, and its transition probability is low. However, for a rare earth element placed in a crystal such as zinc sulfide, the crystal field interacts with the wave function of the $4f$ electrons, resulting in the increase in the $4f$—$4f$ transition probability. Nevertheless, since the transitions between the $4f$-inner-orbit levels of the rare earth element are originally forbidden and therefore the obtainable transition probabilities of the transitions are not high, a high luminance has not been obtained in an EL element comprising a luminescent layer of zinc sulfide with a rare earth element added thereto.

It is also known that if a halogen element such as fluorine or chlorine is further added to a luminescent layer doped with a rare earth element as a luminescent center, the luminance is improved. In this case, source materials used for such a luminescent center are, for example, samarium trichloride ($SmCl_3$), thulium trifluoride ($TmF_3$), or the like.

Nevertheless, even if such a rare earth element halide is added to a luminescent layer, the EL element has a very low luminance, at most 1000 cd/m² (driven at 5 kHz) for red luminescence and 10 cd/m² (driven at 5 kHz) for blue luminescence, which is not practically suitable to be used as a display such as an EL panel.

SUMMARY OF THE INVENTION

The main object of the present invention is to solve the above problem and to provide an EL element having a high luminance.

To attain the above and other objects, the present invention provides an eletroluminescence element comprising an insulating substrate, a first electrode, a first insulating layer, a luminescent layer, a second insulating layer and a second electrode in this order in a stack, at least components on the side of the luminescent layer through which light goes out the electroluminescence element being optically transparent, the luminescent layer being composed of a compound semiconductor as matrix and one or more rare earth elements as luminescent center, the luminescent layer having a luminescence spectrum in which, in addition to the original emission peaks of the rare earth element, one or more emission peaks exist within a 10 nm wavelength range around each of some original emission peaks.

Preferably, the luminescent layer comprises a II–VI compound semiconductor as a matrix to which a rare earth element and a halogen element are added as a luminescent center, the halogen element being substituted for and occupying a site of a VI element of the II–VI compound semiconductor, the rare earth element existing adjacent to the halogen element. The rare earth element more preferably exists at a distance within 4Å from the halogen element. The II–VI compound semiconductor is zinc sulfide. The rare earth element is samarium. The halogen element is chlorine.

In the EL element of the present invention, the luminescent layer comprises a II–VI compound semiconductor as a matrix in which a rare earth element and a halogen element are added as luminescent centers, and the halogen element is substituted for and occupied the site of a VI group element constituting the II–VI compound semiconductor, the halogen element existing adjacent to the rare earth element. As a result, the symmetry of the crystal around the luminescent center is lowered so that interaction of the $4f$-inner-orbit levels in the electron configuration of the rare earth element with the crystal field is caused and each of the energy levels is split. This was confirmed by experiments. Owing to the above interaction with the crystal field, electron transitions between the $4f$-inner-orbit levels of the rare earth element are made easier, although they are originally almost forbidden, and the electron transition probabilities are increased. As a result, the EL element has additional emission peaks within the 10 nm wavelength ranges around each of the original emission peaks of the rare earth element and the EL luminance is significantly improved.

The above EL element can be obtained by a process for fabricating an electroluminescence element comprising an insulating substrate, a first electrode, a first insulating layer, a luminescent layer, a second insulating layer and a second electrode in this order in a stack, at least components on the side of the luminescent layer through which light goes out the electroluminescence element being optically transparent, in which the luminescent layer is of a II–VI compound semiconductor containing one or more rare earth elements, which is deposited by metal organic chemical vapor deposition (MOCVD) in which source gases for the rare earth element and elements constituting the compound semiconductor, not containing any halogen element, are supplied to the vicinity of the insulating substrate, separately from halogen or hydrogen halide gas which is also supplied to the vicinity of the insulating substrate where the source gases and the halogen or hydrogen halide gas react with each other to deposit the compound semiconductor containing a rare earth element. Preferably, the halogen or hydrogen halide gas is chlorine or hydrogen chloride gas.

In accordance with the above process of the present invention, the amount of the halogen element contained in the luminescent layer can be controlled, which was confirmed in experiments. As a result, the atomic ratio of the rare earth element to halogen element in the semiconductor of the luminescent layer can be controlled to a proper value. Moreover, since the amount of the halogen or hydrogen halide can be controlled independently from other gases, the amount of the halogen or hydrogen halide introduced can be reduced to a minimum so that unnecessary etching of the semiconductor film with the halogen or hydrogen halide can be avoided. Further, since the used source gases for rare earth element and semiconductor-constituting elements do not contain any halogen, the grown crystal grains can be coarse and the grain boundaries in the luminescent layer can be decreased in number. As a result, the excitation of the luminescent center of the luminescent layer can be more efficient and thus the EL element can have a higher luminance and be more reliable in comparison with the case where a rare earth halide gas is used.

DESCRIPTION OF THE PREFERRED EMBODIMENTS

Before the present invention is illustrated and described in detail with reference to examples thereof, a typical conventional process for depositing a luminescent layer by a metal organic chemical vapor deposition (MOCVD) is briefly described.

Figure 2:
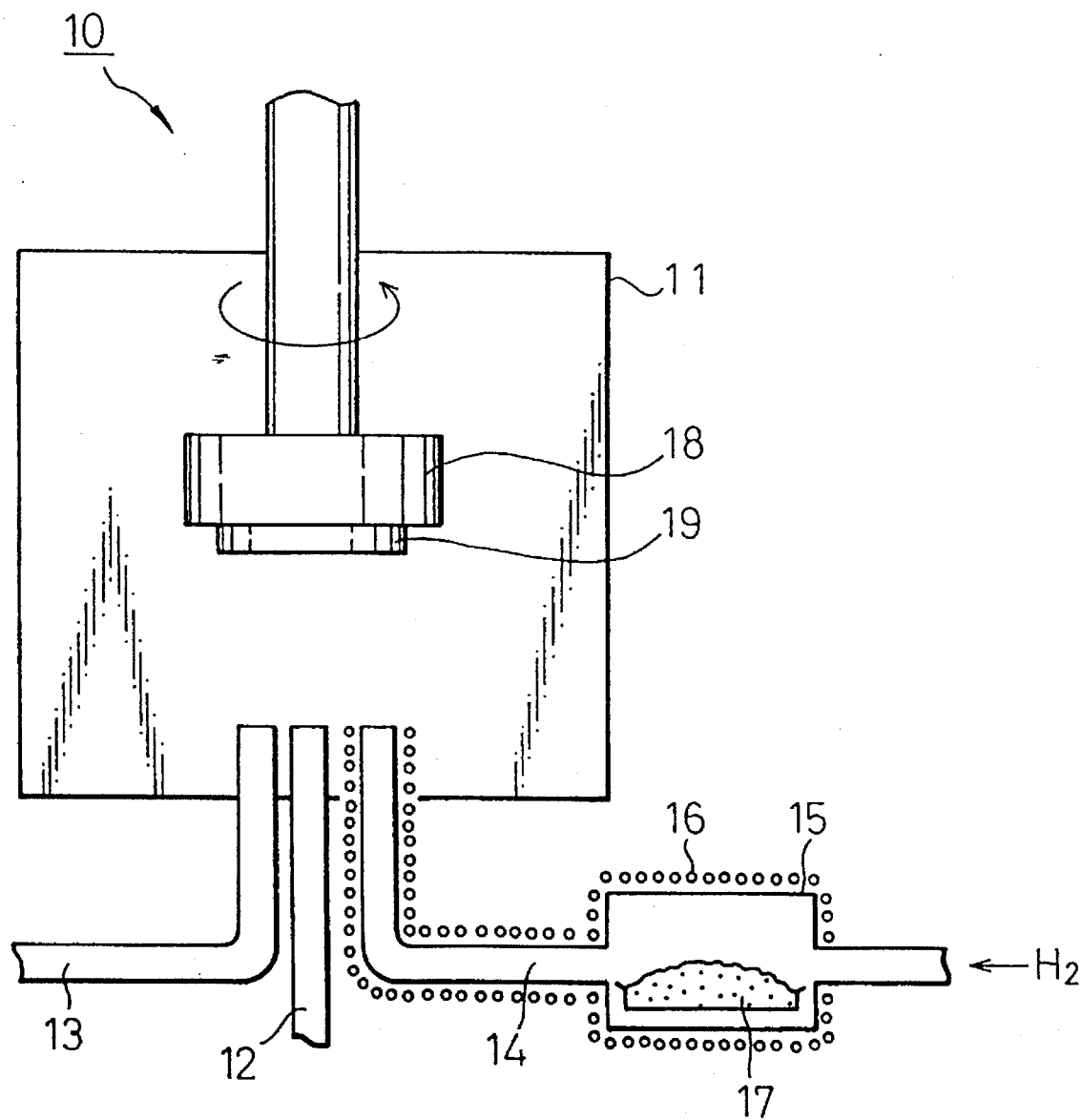
FIG. 2 shows a conventional MOCVD apparatus.

FIG. 2 shows a known MOCVD apparatus 10. Using this apparatus 10, a luminescent layer of zinc sulfide (ZnS) as a matrix with samarium chloride ($SmCl_3$) added thereto as a luminescent center material 17, as an example, is deposited.

Hydrogen ($H_2$) is used for reducing and carrying the luminescent center material 17 of samarium chloride ($SmCl_3$) into a reaction furnace 11. The main source gases for the matrix are diethyl zinc (DEZ: organic zinc compound) and hydrogen sulfide ($H_2S$), to deposit a film of ZnS:Sm (Luminescent layer).

The MOCVD apparatus 10 comprises a nozzle 12 for supplying DEZ and a nozzle 13 for supplying $H_2S$ in the bottom of the reaction furnace 11. The top of the reaction furnace 11 is equipped with a rotatable susceptor 18 on which a substrate 19 is mounted. The film is to be deposited on the substrate 19.

A nozzle 14 for vertically supplying a luminescent center material toward the substrate 19 is provided at the bottom the reaction furnace 11. The upstream of the nozzle 14 is provided with a reaction chamber 15 where the luminescent center material 17 is reduced. The nozzle 14 and the reaction chamber 15 are surrounded and wound by a heater 16 for keeping the inside temperature constant. The reaction furnace 11 is connected with a vacuum pump (not shown).

Figure 1:
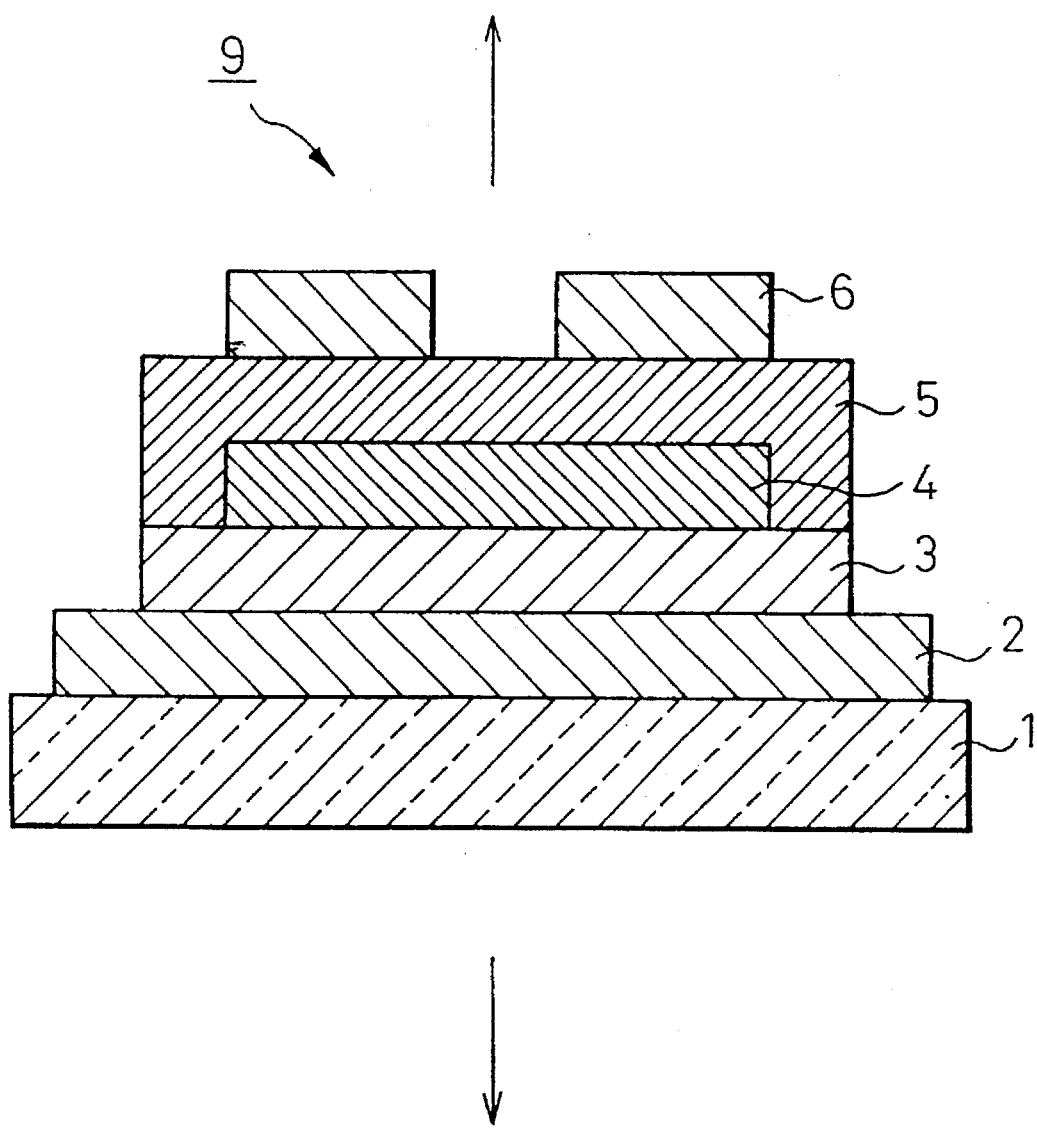
FIG. 1 shows the cross-sectional view of an EL element.

To improve the luminance of the EL element having the structure as shown in FIG. 1, it is important that the crystallinity of the luminescent layer 4 be improved. Nevertheless, the luminescent layer 4 is generally composed of a polycrystalline II–VI compound semiconductor such as zinc sulfide and the luminescent layer 4 contains many crystal grain boundaries. The crystal grain boundaries cause scattering of the electrons, accelerated by an electric field, so that the efficient excitation of the luminescent centers is impeded. The crystal grain boundaries have large lattice strains due to misalignment of crystal orientation so that there are many non-radiative recombination centers which are detrimental to electroluminescence. Accordingly, it is important to enlarge the crystal grains and reduce the crystal grain boundaries, in order to improve the crystallinity of the luminescent layer.

In a conventional CVD for depositing a luminescent layer, halogen element-containing gases are used as source gases for semiconductor-constituting elements and rare earth element. Therefore, a large amount of halogen element is introduced into the luminescent layer during decomposition of the source gases and deposition of the crystalline layer. The large number of the halogen elements become nuclei for crystal grains and a large number of crystal grains are thus formed. These crystal grains impede crystal growth with each other so that enlargement of crystal grains of the luminescent layer is prevented.

It is known that semiconductors such as zinc sulfide are corroded with an acid. A large amount of halogen or hydrogen halide, for example, hydrogen chloride (HCl), formed by reaction over the surface of the substrate etches zinc sulfide (ZnS) immediately when the zinc sulfide is deposited, so that the crystal growth of the zinc sulfide is impeded.

It is also known that a high luminance and reliability of an EL element relate to an atomic ratio of a rare earth element contained in the luminescent layer and require the halogen element to be contained in an adequate amount in the luminescent layer.

It is however difficult in the conventional MOCVD apparatus as shown in FIG. 2 to enlarge crystal grains and control the amount of a halogen element in a luminescent layer.

In accordance with the present invention, the above problems of the conventional method are solved.

The general structure of an EL element fabricated in accordance with the present invention is similar to that as shown in FIG. 1.

Figure 3:
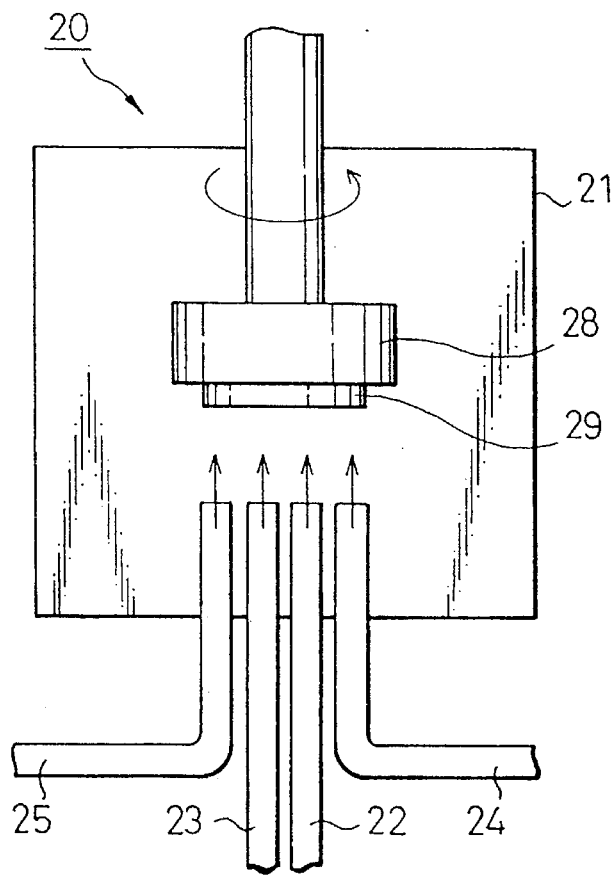
FIGS. 3 and 4 show MOCVD apparatuses used in a process of the present invention.

FIG. 3 shows a MOCVD apparatus 20 used for depositing a luminescent layer of an EL element as shown in FIG. 1 in accordance with the present invention. In the MOCVD apparatus 20, a reaction furnace 21 is provided with a rotatable susceptor 28 on the top of the reaction furnace 21. A substrate 29 on which a film is to be deposited is mounted on the susceptor 28. At the bottom of the reaction furnace 21, a nozzle 22 for supplying a II group element, a nozzle 23 for supplying a VI group element, a nozzle 24 for supplying a rare earth element and a nozzle 25 for supplying a halogen element are provided to vertically introduce gases toward the substrate 29. The nozzles 22 to 25 are arranged so that supply gases do not react with each other until they reach the vicinity of the substrate 29. A vacuum pump, not shown, is provided in the reaction furnace 21.

Figure 4:
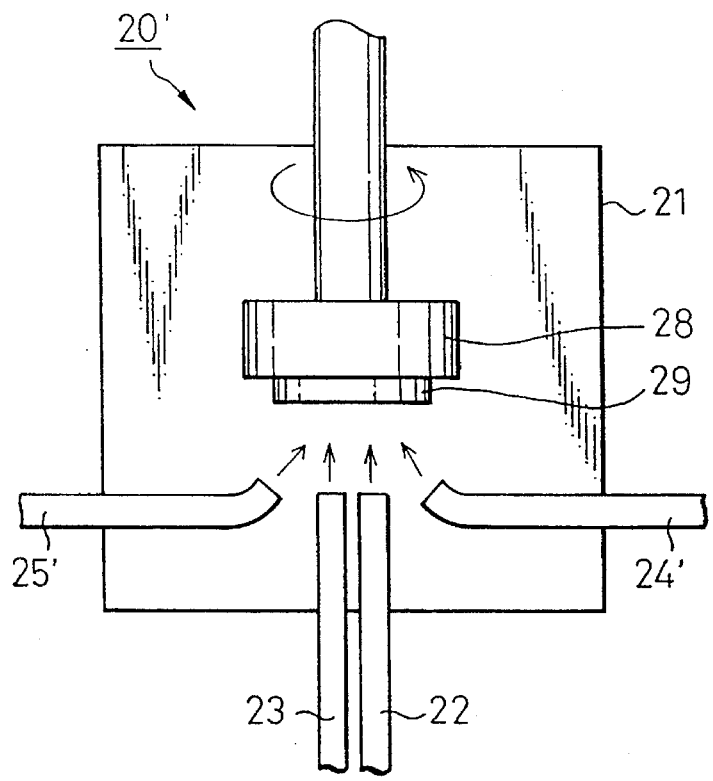

FIG. 4 shows another MOCVD apparatus 20' for depositing a luminescent layer of an EL element in accordance with the present invention. The MOCVD apparatus 20' is similar to the MOCVD apparatus 20 as shown in FIG. 3 except that nozzles 24' and 25', corresponding to the nozzles 24 and 25, are arranged in the sides of the furnace.

The fabrication of an EL element is described below.

First, on a glass substrate 1 was deposited a first transparent electrode 2. The first transparent electrode 2 was deposited in an ion plating apparatus using an evaporation source of zinc oxide (ZnO) with gallium oxide ($Ga_2O_3$) added thereto in the form of pellets. The ion plating apparatus was evacuated to $5 \times 10^{-3}$ Pa while keeping the temperature of the glass substrate 1 at 150° C. Argon (Ar) gas was then introduced to $6.5 \times 10^{-1}$ Pa and the beam power and frequency were adjusted so as to conduct a deposition at a rate of 0.1 to 0.3 nm/sec.

Next, on the first electrode 2 was deposited a first insulating layer 3 of tantalun pentoxide ($Ta_2O_5$) by sputtering. A sputtering apparatus was evacuated to 1.0 Pa while maintaining the temperature of the glass substrate 1 at 200° C. A mixed gas of argon (Ar) and oxygen ($O_2$) was then introduced into the apparatus and a radio frequency was applied so as to conduct a deposition at a rate of 0.2 nm/sec.

In the MOCVD apparatus as shown in FIG. 3, on the first insulating layer 3 formed is a luminescent layer 4 of zinc sulfide (ZnS) as a matrix with samarium (rare earth element) and chlorine (halogen element) added thereto as luminescent centers. The glass substrate 1 was kept at 450° C. and the reaction furnace 1 was evacuated to a reduced pressure. Subsequently, diethyl zinc ($Zn(C_2H_5)_2$) using hydrogen as a carrier gas was introduced to the reaction furnace from the nozzle 22 at a rate of 250 cc/min, and hydrogen sulfide ($H_2S$) diluted with hydrogen was introduced from the nozzle 23 at a rate of 200 cc/min. Samarium tridipivaloilmethane ($Sm(DPM)_3$) for adding a luminescent center was heated to higher than 150° C. and the resultant gas was supplied using hydrogen as a carrier gas at a rate of 25 cc/min. Hydrogen chloride (HCl) diluted with hydrogen was introduced from the nozzle 25 into the reaction furnace at a rate of 50 cc/min. The pressure in the reaction furnace 21 was kept at 100 Pa. Thus, a luminescent layer 4 was deposited.

It was confirmed in EPMA (Electron Probe Micro Analysis) that the luminescent layer 4 contained samarium and chlorine in a concentration of 0.2 atomic %, respectively. In other words, the atomic ratio (Cl/Sm) of the chlorine (halogen element) to samarium (rare earth element) was 1.

Next, on the luminescent layer 4 was deposited a second insulating layer 5 of tantalum pentoxide ($Ta_2O_5$) in the same manner as for the first insulating layer 3. On the second insulating layer 5 was deposited a second transparent electrode 6 of zinc oxide (ZnO) in the same manner as for the first transparent electrode 2.

The thicknesses of the respective layers are 300 nm of the first and second transparent electrodes 2 and 6, 400 nm of the first and second insulating layers 3 and 5, and 1000 nm of the luminescent layer 4.

Figure 5A:
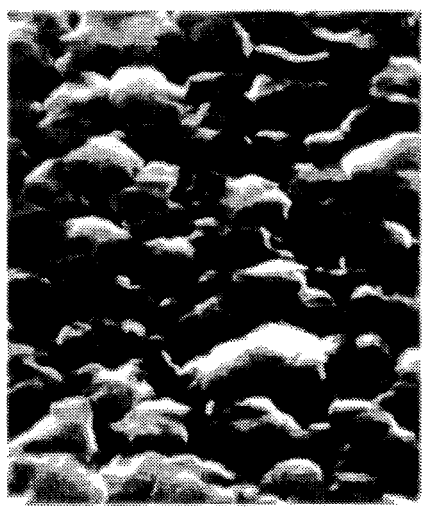
FIGS. 5A, 5B and 5C are SEM photographs of the surfaces of zinc sulfide semiconductors formed in the examples of the present invention.
Figure 5B:
Figure 5C:

FIGS. 5A to 5C are scanning electron microphotographs of the surfaces of luminescent layers of zinc sulfide prepared in accordance with the above process in which the flow rates of the hydrogen chloride gas diluted with hydrogen were 0 cc/min, 25 cc/min and 50 cc/min, respectively. The zinc sulphide layers had the concentrations of the chlorine element of 0 at %, 0.2 at % and 0.5 at %, respectively, and had an identical concentration of samarium, which were confirmed by EPMA.

Figure 6:
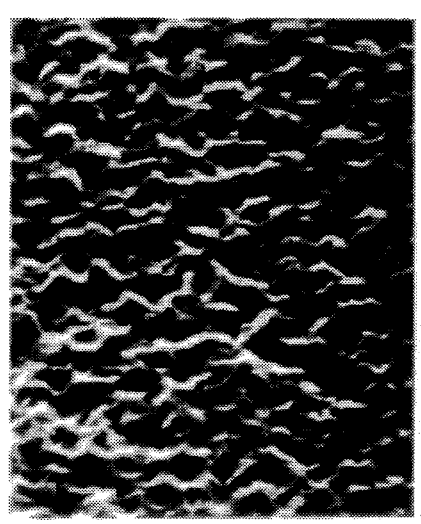
FIG. 6 is a SEM photograph of the surface of zinc sulfide semiconductor formed in a conventional process.

It is confirmed that the grain size of the above samples decreases as an increase of the flow rate of the hydrogen chloride gas diluted with hydrogen. It should be noted that, although the crystal grain size of the samples (zinc sulfide) decrease with an increase of the flow rate of the hydrogen chloride gas diluted with hydrogen, these crystal grain sizes of the samples (zinc sulphide) are significantly larger than those of conventional luminescent layers. For example, FIG. 6 shows a scanning electron microphotograph of the surface of a luminescent layer ($ZnS:SmCl_3$) prepared using a MOCVD apparatus as shown in FIG. 2 in which samarium trichloride ($SmCl_3$) was used as a source for a luminescent center in zinc sulfide. It is seen that the crystal gain size of this sample is very small in comparison with the samples in accordance with the present invention.

Figure 7:
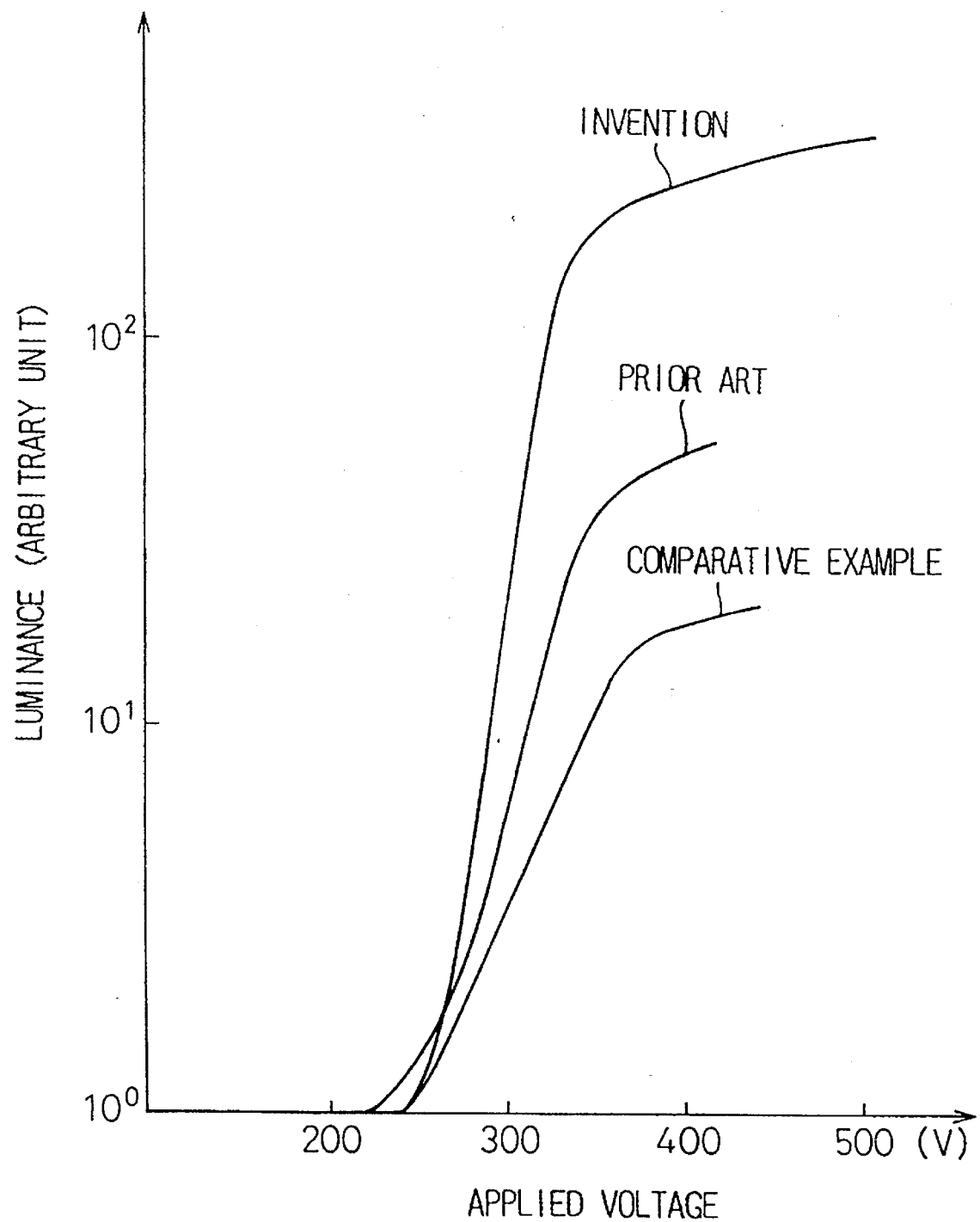
FIG. 7 shows the relationship between the luminance and the applied voltage of EL elements.

FIG. 7 shows the relationships between the luminance of EL element and the voltage applied to the EL element. The curve indicated as the present invention is that of the EL element fabricated in the process described above and having a luminescent layer with an atomic ratio Cl/Sm of 1. In comparison, the curve indicated as prior art is the curve of an EL element having a luminescent layer (ZnS:Sm,Cl) of zinc sulfide with chlorine added thereto (atomic ratio Cl/Sm>3) using samarium trichloride as a source for a luminescent center, and the curve indicated as comparative example is the curve of an EL element having a luminescent layer of zinc sulphide:samarium (ZnS:Sm) not containing chlorine (atomic ratio Cl/Sm=0).

It was found that an atomic ratio of halogen element to rare earth element in a luminescent layer should be in a range of 0.5 to 3 in order to obtain a high luminance in comparison with a conventional one, and more preferably it is near 1.

Accordingly, in the process as described above, the flow rate of a hydrogen chloride gas diluted with hydrogen was adjusted so as to obtain an optimum atomic ratio of chlorine to samarium in zinc sulfide of 1.

As a result, the EL element had a luminant significantly higher than those of conventional EL elements having a luminescent layer with the ratio (Cl/Sm) outside of the range of 0.5 to 3.

In a process similar to above, another EL element was fabricated. The fabricated EL element has the same general structure as shown in FIG. 1.

First, on a glass substrate 1 was deposited a first transparent electrode 2. The first transparent electrode 2 was deposited in an ion plating apparatus using an evaporation source in the form of pellets of a mixture of zinc oxide (ZnO) with gallium oxide ($Ga_2O_3$). The ion plating apparatus was evacuated while keeping the temperature of the glass substrate 1 constant. Argon (Ar) gas was then introduced and the beam power and frequency were adjusted so as to conduct a deposition at a rate of 6 to 18 nm/sec.

Next, on the first electrode 2 was deposited a first insulating layer 3 of tantalum pentoxide ($Ta_2O_5$) by sputtering. A sputtering apparatus was evacuated while maintaining the temperature of the glass substrate 1 constant. A mixed gas of argon (Ar) and oxygen ($O_2$) was then introduced into the apparatus and a deposition was conducted at a radio frequency of 1 kW.

In the MOCVD apparatus as shown in FIG. 3, on the first insulating layer 3 formed is a luminescent layer 4 of zinc sulfide (ZnS) as a matrix with samarium (rare earth element) and chlorine (halogen element) added thereto as luminescent centers. The glass substrate 1 was kept at 450° C. and the reaction furnace 1 was evacuated to a reduced pressure. Subsequently, diethyl zinc ($Zn(C_2H_5)_2$) using hydrogen as a carrier gas and hydrogen sulfide ($H_2S$) diluted with hydrogen were flown in the reaction furnace. Samarium tridipivaloilmethane ($Sm(DPM)S_3$) for adding a rare earth element as a luminescent center was introduced in the reaction furnace by heating a source for samarium tridipivaloilmethane ($Sm(DPM)_3$) to 150° C. or higher and using hydrogen as a carrier gas. Hydrogen chloride (HCl) diluted with hydrogen was introduced into the reaction furnace. The pressure in the reaction furnace 21 was kept constant. Thus, a luminescent layer 4 was deposited.

It was then confirmed in EPMA (Electron Probe Micro Analysis) that the luminescent layer 4 contained samarium and chlorine in a concentration of 0.2 atomic %, respectively. In other words, the atomic ratio (Cl/Sm) of the chlorine (halogen element) to samarium (rare earth element) was 1.

Next, on the luminescent layer 4 was deposited a second insulating layer 5 of tantalum pentoxide ($Ta_2O_5$) in the same manner as for the first insulating layer 3. On the second insulating layer 5 was deposited a second transparent electrode 6 of zinc oxide (ZnO) in the same manner as for the first transparent electrode 2.

The thicknesses of the respective layers are 300 nm of the first and second transparent electrodes 2 and 6, 400 nm of the first and second insulating layers 3 and 5, and 600 nm of the luminescent layer 4.

Figure 8:
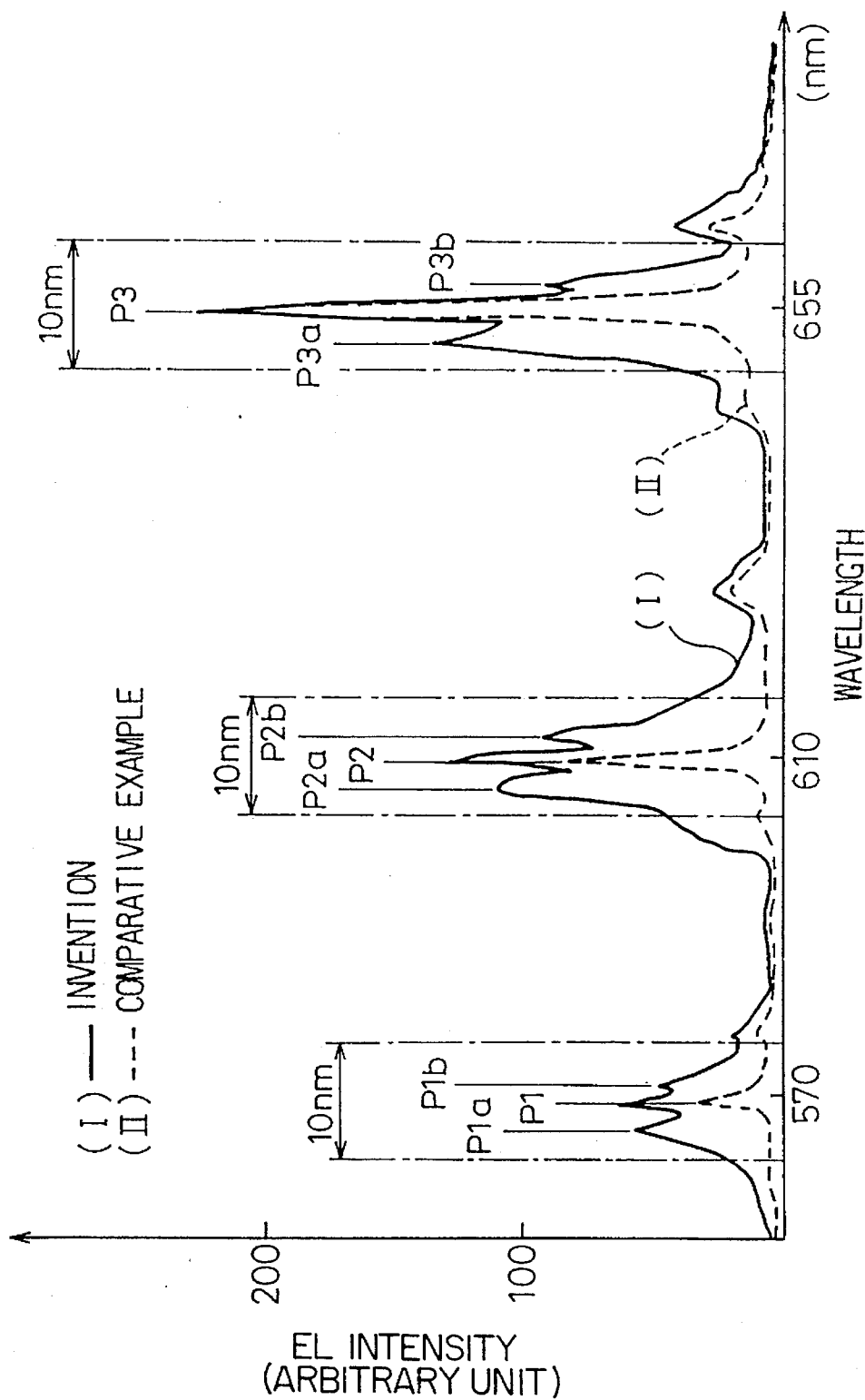
FIG. 8 shows the relationship between the intensity of electroluminescence and the emission wavelength of EL elements.

FIG. 8 shows the characteristic of the electroluminescence fabricated as above. The characteristic of the EL element is the relationship of the intensity (arbitrary unit) to spectrum (wavelength: nm) of the EL emission at room temperature. The characteristic of the EL element in accordance with the present invention is shown by the solid line (I). For comparison, the characteristic of an EL element having a luminescent layer with no halogen element is shown by the broken line (II). This comparative EL element was fabricated by a process similar to the above example except that hydrogen chloride was not introduced into the reaction furnace.

Both EL elements of the present invention and comparative example have original emission peak wavelengths (P1, P2, P3) of emission spectrum of 4f-levels of samarium (Sm). The original emission peaks P1, P2, P3 exist near 570 nm, 610 nm and 655 nm, respectively. Further, the EL element of the present invention has split peaks (P1a, P1b; P2a, P2b; P3a, P3b) around each of the original emission peaks P1, P2, P3.

These split peaks exist in a width of wavelength of 10 nm including the original emission peak (P1, P2, P3) and are separated in such a manner that their number is countable by eye.

These split peak spectra demonstrate that chlorine (halogen element) is substituted for and occupies the site of sulfur of the VI group element of the matrix and is placed in the vicinity of samarium. The resulting change in crystal field causes splitting of 4f-levels of samarium.

As shown above, the peaks of the EL element of the present invention (I) have a larger area than that of the comparative one (II) due to a plurality of peaks, so that the intensity of the electroluminescence of the EL element of the present invention (I) is significantly improved.

Figure 9:
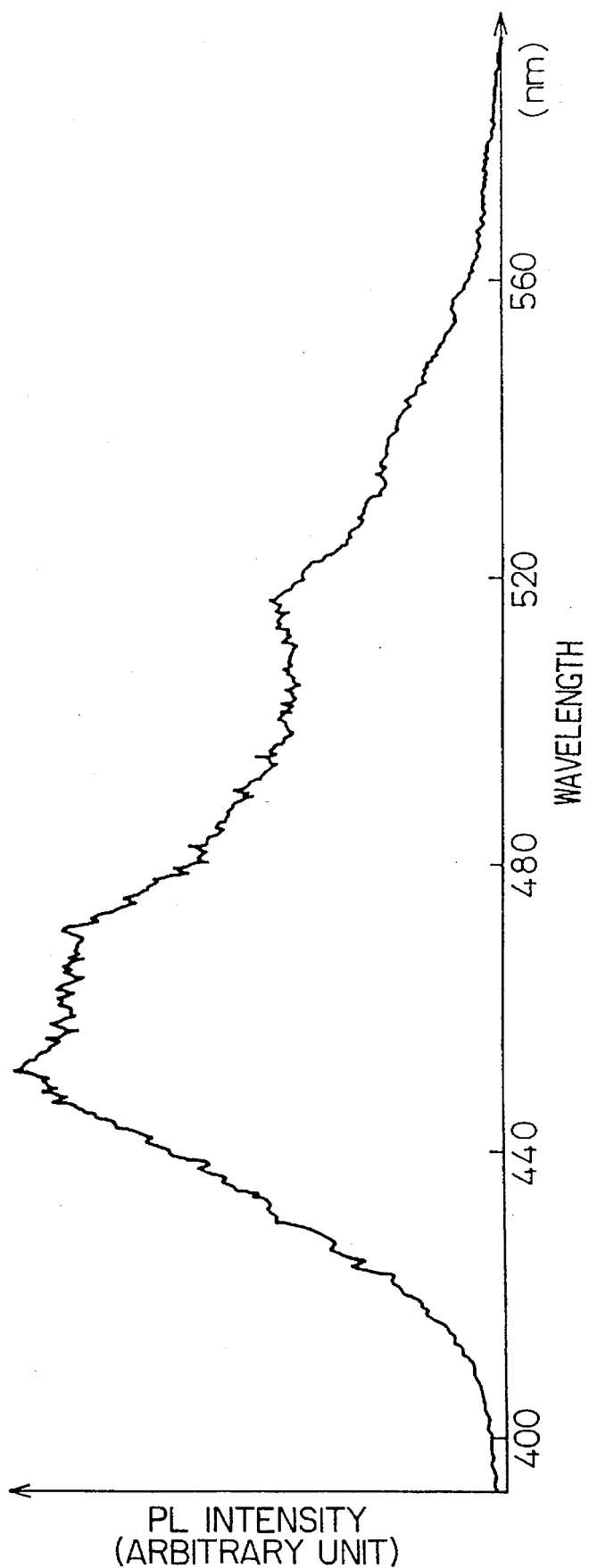
FIG. 9 shows the relationship between the intensity of photoluminescence and the photoluminescence wavelength of the EL element of the present invention.

FIG. 9 shows the photoluminescence (PL) spectrum of the above EL element of the present invention. The PL spectrum is the relationship of the intensity (arbitrary unit) to spectrum (wavelength: nm) of the photoluminescence at room temperature. This spectrum shows a broad emission peak with a center of 460 nm, which relates to chlorine (halogen element) substituted for and occupying the site of sulfur of the VI element of zinc sulfide as the matrix and a zinc vacancy. Accordingly, this PL spectrum clearly confirms that chlorine is definitely substituted for sulfur in the luminescent layer of the EL element of the present invention.

Figure 10:
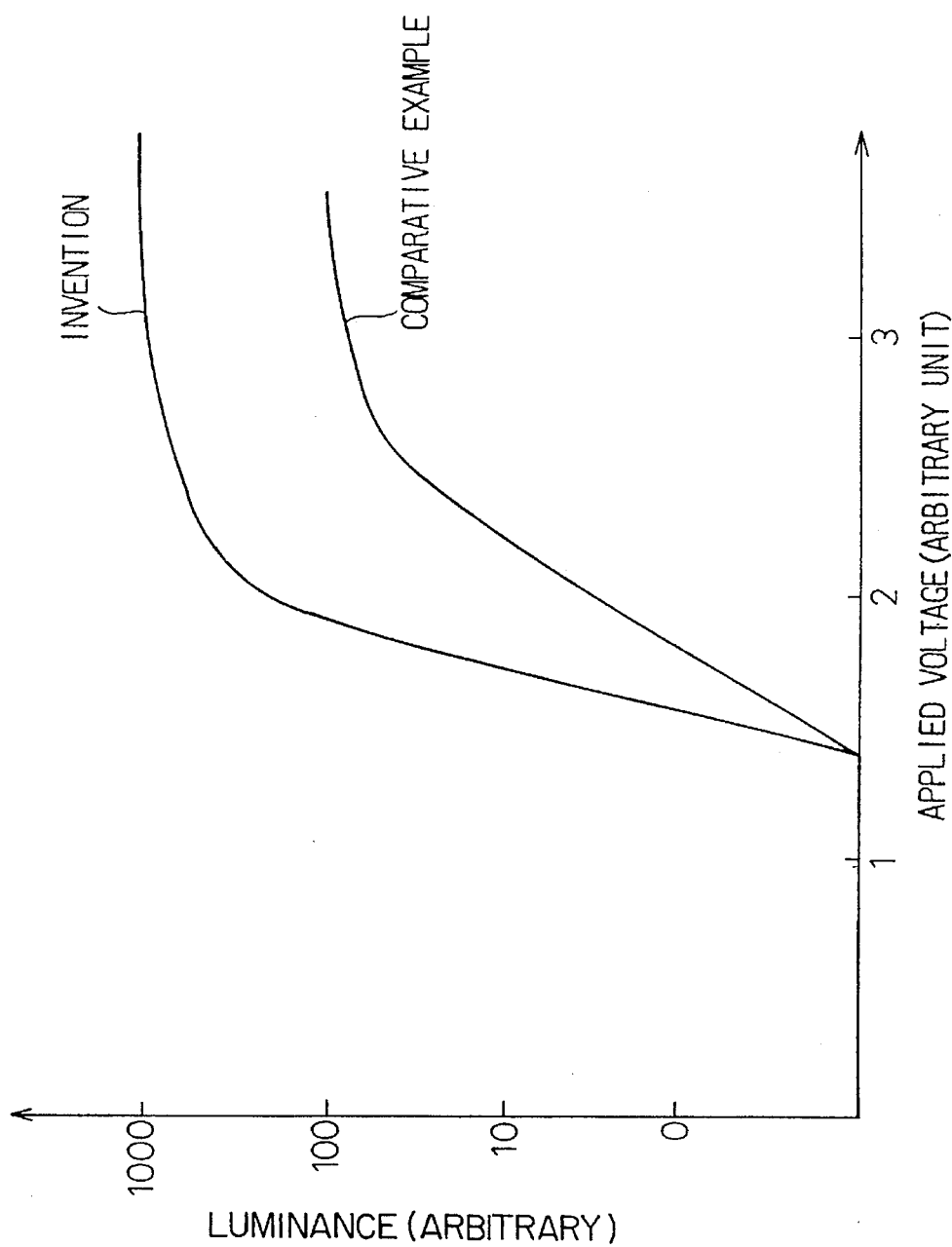
FIG. 10 shows the relationship between the luminance and the applied voltage of EL elements.

FIG. 10 shows the characteristic of the luminance of the EL element in relation to the applied voltage. The EL element of the present invention is the one fabricated in the above. The comparative one was fabricated in the same manner as above for the comparative one in FIG. 8, i.e., without adding hydrogen chloride in the process of the present invention.

The EL element of the present invention has a maximum intensity of the luminance about one order of magnitude (ten times) higher than that of the comparative one and the luminance rises very abruptly. Thus, the EL element of the present invention is significantly improved in its luminance.

We claim:

1. A process for fabricating an electroluminescence element comprising an insulating substrate, a first electrode, a first insulating layer, a luminescent layer having at least one side constructed and arranged for allowing light to pass out of the electroluminescence element, a second insulating layer, and a second electrode in this order in a stack, and components on the at least one side of the luminescent layer being optically transparent, in which the luminescent layer is of a compound semiconductor containing a rare earth element, comprising the steps of:

supplying at least one source gas containing at least one component of a luminescent center element to the vicinity of the insulating substrate;

separately supplying a hydrogen chloride gas to the vicinity of the insulating substrate;

preventing direct contact between the at least one source gas and the hydrogen chloride gas until the gases reach the vicinity of the insulating substrate for deposition;

reacting the at least one source gas and the hydrogen chloride gas to form the compound semiconductor; and depositing the compound semiconductor.

2. A process according to claim 1, wherein the step of depositing is conducted in the presence of an organometallic compound.

3. A process according to claim 1, wherein the at least one luminescent center element is a rare earth element.

4. A process according to claim 1, further comprising the step of controlling a flow rate of the hydrogen chloride gas relative to the at least one source gas so as to obtain an atomic ratio of chlorine to the at least one luminescent center element of from 0.5 to 3.

5. A process according to claim 4, wherein the atomic ratio is about 1.

6. A process for fabricating an electroluminescence element comprising an insulating substrate, a first electrode, a first insulating layer, a luminescent layer having at least one side constructed and arranged for allowing light to pass out of the electroluminescence element, a second insulating layer, and a second electrode in this order in a stack, and components on the at least one side of the luminescent layer being optically transparent, in which the luminescent layer is of a II–VI compound semiconductor containing a rare earth element, comprising the steps of:

supplying at least one source gas containing at least one component of a luminescent center element to the vicinity of the insulating substrate;

separately supplying a hydrogen chloride gas to the vicinity of the insulating substrate;

preventing direct contact between the at least one source gas and the hydrogen chloride gas until the gases reach the vicinity of the insulating substrate for deposition;

reacting the at least one source gas and the hydrogen chloride gas to form the II–VI compound semiconductor; and depositing the II–VI compound semiconductor, such that the at least one component and chlorine form the luminescent center element, the chlorine being substituted for and occupying a site of a VI group element of the II–VI compound semiconductor, and the at least one component being adjacent to the chlorine.

7. A process according to claim 6, wherein a distance between the halogen element and the adjacent rare earth element in the compound semiconductor of the luminescent layer is within 4Å.

8. A process according to claim 6, wherein the step of depositing is conducted in the presence of organometallic compound.

9. A process according to claim 6, wherein the at least one luminescent center element is a rare earth element.

10. A process according to claim 6, further comprising the step of controlling a flow rate of the hydrogen chloride gas relative to the at least one source gas so as to obtain an atomic ratio of chlorine to the rare earth element of from 0.5 to 3.

11. A process according to claim 10, wherein the atomic ratio is about 1.

* * * * *